United States Patent [19]

Yoshimura et al.

[11] Patent Number: 5,089,341
[45] Date of Patent: Feb. 18, 1992

[54] HIGH-SENSITIVITY THERMOSENSITIVE MULTILAYER FILM AND METHOD FOR PRODUCTION OF PLATE-MAKING STENCIL SHEET

[75] Inventors: Isao Yoshimura, Fujisawa; Toshiaki Ohno; Hideo Hata, both of Suzuka, all of Japan

[73] Assignee: Asahi Kasei Kogyo Kabushiki Kaisha, Osaka, Japan

[21] Appl. No.: 389,279

[22] Filed: Jul. 17, 1989

[30] Foreign Application Priority Data

Jan. 12, 1989 [JP] Japan .................. 1-5389

[51] Int. Cl.⁵ .............................. B32B 27/08
[52] U.S. Cl. .................. 428/412; 156/229; 156/344; 428/475.8; 428/480
[58] Field of Search ........... 156/229, 344; 428/412, 428/475.8, 480

[56] References Cited

U.S. PATENT DOCUMENTS 4,766,033  8/1988  Yoshimura et al. ............ 428/332

FOREIGN PATENT DOCUMENTS

| 57-176125 | 10/1982 | Japan . |
| 57-176126 | 10/1982 | Japan . |
| 60-89396 | 5/1985 | Japan . |
| 60-178031 | 9/1985 | Japan . |
| 61-31236 | 2/1986 | Japan . |
| 62-282983 | 12/1987 | Japan . |
| 63-53097 | 3/1988 | Japan . |
| 63-209996 | 8/1988 | Japan . |
| 64-14092 | 1/1989 | Japan . |

Primary Examiner—William J. Van Balen
Attorney, Agent, or Firm—Birch, Stewart, Kolasch & Birch

[57] ABSTRACT

The present invention relates to the high-sensitivity thermosensitive multilayer film and the method to produce plate-making paper using the film. In the present invention, the high-sensitivity thermosensitive multilayer film consists of at least one functional layer and at least one peeling layer. The said functional layer is made of the thermoplastic resin layer with the thickness of 0.1 to 12 μm and with at least 30% of a thermal shrinkage rate and at least 50 g/mm² of thermal shrinkage stress value. The peeling layer consists of the thermoplastic resin layer which is different from that of the functional layer and is the special multilayer film which is readily releasable and capable of exerting a compressive force to the functional layer. When the stencil sheet is manufactured by using the said multilayer film, the operation efficiency at time of lamination and the shrinkage capacity can improve by peeling the said peeling layer after lamination from porous supporting member. Moreover the resistance of the original paper to curling is remarkably enhanced under a high temperature circumstances by removing the compressive force working on the functional layer as result of peeling the peeling layer after lamination if the compressive force exists at the said peeling layer.

15 Claims, No Drawings

HIGH-SENSITIVITY THERMOSENSITIVE MULTILAYER FILM AND METHOD FOR PRODUCTION OF PLATE-MAKING STENCIL SHEET

BACKGROUND OF THE INVENTION

1. Field of the Invention

This invention relates to a novel high-sensitivity thermosensitive multilayer film and a method for the production of a stencil sheet using the film. More particularly, this invention relates to a high-sensitivity thermosensitive multilayer film suitable for the production of a stencil sheet for recording therein information on a given original by being perforated with the image or lettering of the information at a prescribed position by direct heating with the pulsating irradiation using a laser beam, particularly a semiconducting laser beam of low energy, or a LED beam, indirect heating owing to the steps of heating a given original by flashing instantaneous irradiation using a flash lamp or a xynon-krypton lamp and transferring the heat to the film, or contact conduction of heat with a thermal head and to a method for the production of the stencil sheet mentioned above.

2. Description of the Prior Art

Recently, the technique of preparing a stencil sheet perforated with the information of a given original by means of a thermal head, an electric discharge device, or an electrifying recording device and using this perforated stencil sheet as a plate for printing has been developed and put to use. Studies on new plate-making means relying on the use of a LED array, a laser array, and a laser head, for example, are now underway.

As a means of making the plate of the type mentioned above, the method which comprises tightly superposing on the film surface of the stencil sheet an original having lettering or an image expressed thereon as with ink or toner capable of absorbing a ray, causing the lettering or image on the original to generate heat as by perforating means of high energy region resorting to infrared ray or flash light from the xenon lamp, and conducting the heat to the film surface thereby melting the film for necessary perforation and consequently obtaining the effecting necessary plate making has been known to the art.

As the stencil sheet to be used, in this case for the plate making, the laminate produced by stretching a polyethylene terephthalate film in an independent form and about 2 μm in thickness with an extremely expensive high-precision tenter and, at the same time, thoroughly heat-treating the film in the posterior part of the same tenter thereby crystallizing the resin of the film (to crystallinity of about 45% as determined by the density method) and superposing the resultant stretched film on a supporting member such as onion paper or sheet (in a meshed form) by the use of an adhesive agent in a separate step has been known in the art.

Though this laminate possesses sufficient resistance to heat and exhibits highly satisfactory dimensional stability, it inevitably sustains scratches, wrinkles, warp, strain (uneven tention), and breakage because, during the aforementioned super-position of the film on the supporting member through the medium of the adhesive agent, the adhesion of the supporting member to the film occurs with the irregularities of surface of the supporting member persisting and manifesting themselves through the film surface to the extent of jeopardizing the microscopic smoothness of the film surface and disrupting the evenness of thickness of the film due to uneven application of the adhesive agent along the interface. Moreover, the superposition of one such polyethylene terephthalate film on the supporting member is carried out in a stretched state with meticulous care. In spite of the elaboration, it is difficult to obtain the laminate with fully satisfactory uniformity. The stencil sheet currently obtainable by this lamination, therefore, possesses no fully satisfactory quality.

When the plate for printing is made of the stencil sheet which has inferior quality due to the performance of the laminating method, it entails disadvantages such as the phenomenon of curling the separation of layers along the interface of adhesion, and the heavy local deterioration of sensitivity or resolution. When the perforating means of high energy region is used, this problem does not require very serious consideration. The problem, however, dictates very serious consideration when the perforating means of low energy region is used.

The thermal heads provides with very small heating elements (10 to 16 dots/mm, for example) and utilized extensively in various types of printers, word processors, and facsimiles which are now tending toward digitization are subjected to a special study aimed at miniaturization, improvement in operating speed, and economization of energy. When the plate making is carried out by the use of such a thermal head, therefore, the stencil sheet to be used for the production of the plate is particularly required to exhibit high sensitivity and high resolution and possess a uniform quality.

As a means of producing the stencil sheet of this description, the method which comprises preparing a thin single-layer film, tightly pressing the film against a specular-surface roll, and superposing the film on a supporting member [Japanese Patent Application Disclosure SHO 60(1985)-89,396] has been proposed, for example. The method of this nature is at a disadvantage in requiring a meticulous care in the handling of the film, being complicate operationally, necessitating the use of an expensive laminating device and a clean plant atmosphere, and demanding a consideration for protection against adverse effects of static electricity. In this method, When the film is made of a material susceptible to fracture or a material of weak nerve (low modulus of elasticity) or the film has a very small thickness of less than 2 μm the stencil sheet produced cannot acquire fully satisfactory quality because the film is prone by nature to various troubles.

Studies are also under way in search of a method capable of imparting enhanced sensitivity to the film itself which is destined to be perforated. For example, the method which comprises causing a soft polymer relatively susceptible to thermal fusion to be superposed by the natural solution casting method in the form of a very thin layer about 1.0 μm in thickness on a porous supporting member, and quickly drying the superposed layer of polymer, thereby inducing cast orientation of the polymer and consequently producing a stencil sheet having the sensitivity of perforation improved owing to the smallness of thickness has been proposed [Japanese Patent Application Disclosure SHO 63(1988)-209,996]. The stencil sheet which is produced as described above, however, is unsatisfactory as in terms of the recovery of solvent and the speed of drying on account of the process of production and, moreover, is disadvantageous in inevitably losing locally the uniformity of thickness of the film and consequently having a restriction as to the lower limit of film thickness. Further, this method has no alternative but to use a film of low softening point because it is required to improve sensitivity in the state of low orientation. When the produced stencil sheet is preserved at a high temperature of about 50° C., for example, it is liable to induce the phenomenon of curling and, in an extreme case, the phenomenon of delamination. When the plate making is carried out by the use of a thermal head, the stencil sheet is liable to stick to the thermal head. The stencil sheet is also disadvantageous in being deficient in resistance to the impact of printing and in resolution because it has conspicuously lower strength than the biaxially stretched film.

There are known methods which obtain a desired layer by costretching a multiplicity of layers including a supporting layer and then separating the layer from the other layers [Japanese Patent Application Disclosure SHO 57(1982)-176,125 and SHO 57(1982)-176,126]. These methods are unsatisfactory in that the produced film is deficient in stretching property and peeling property. These inventions do not suggest the high-sensitivity thermosensitive multilayer film of the present invention permitting easy separation and excelling in resistance to the phenomenon of curling. The method which comprises costretching a multilayer film combining a polyethylene terephthalate resin and a polypropylene resin, then heat-treating the costretched film at an elevated temperature in the range of 100° to 240° C., for example, thereby thoroughly crystallizing the polyethylene terephthalate layer and imparting enhanced peeling property to the layer, and subsequently peeling and obtaining a film resistance to heat (useful as a thin-wall film for a condenser, for example) has been known to the art [Japanese Patent Application Disclosure SHO 60(1985)-178,031]. The method which comprises subjecting the film of a similar layer combination to sequential biaxial stretching and then simultaneous biaxial stretching, subsequently heat-treating the stretched film at a temperature higher than the crystal melting point of polypropylene and lower than the crystal melting point of polyester, thereby sufficiently promoting the crystallization of the polyester, and thereafter effecting the peeling has been known [Japanese Patent Application Disclosure SHO 61(1986)-31,236]. These methods are invariably based on the concept that since the peeling made during the course of stretching results in fracture of the film or in loss of uniformity of the film, the facility of peeling ought to be ensured by thoroughly carrying out the heat treatment mainly after the stretching thereby promoting the crystallization of polyester. These methods have been utilized in the method which comprises first laminating the film and a supporting element and subsequently carrying out the peeling [Japanese Patent Application Disclosure SHO 63(1988)-53,097] and the method which comprises similarly laminating a multilayer film and a supporting member and subsequently carrying out the peeling thereby producing a stencil sheet for plate making [Japanese Patent Application Disclosure SHO 64-14,092]. All of these methods belong to a technical level different from the technical level of the present invention which concerns the method for highly efficient production of a high-sensitivity film and a stencil sheet for plate making enjoying high facility of peeling and high quality and the method for producing a stencil sheet for plate making excelling in resistance to the phenomenon of curling.

The present inventors have filed their basic invention relating to the high-sensitivity themosensitive film with the Japanese Patent Office [Japanese Patent Application Disclosure SHO 62(1987)-282,983] and with the U.S. Patent and Trademark Office [U.S. Pat. No. 4,766,033]. This invention is directed to the thermosensitive film itself and is highly effective in itself. When the stretched multilayer film is peeled to obtain the desired layer and this layer is laminated with the porous supporting member, the lamination at times is difficult to perform and the produced laminate is liable to curl.

SUMMARY OF THE INVENTION

An object of this invention, concieved to eliminate the disadvantages associated with the conventional thermosensitive plate-making stencil sheet, is to provide a high-sensitivity thermosensitive multilayer film possessing a flat smooth surface, having no possibility of sustaining qualitative defects such as scratches, wrinkles, warp, strain, float and fractures, and not entailing such adverse phenomena as curling and delamination and a stencil sheet capable of producing a plate for printing with high sensitivity and high resolution.

The inventors have conducted various studies in search of a novel themosensitive plate-making quality stencil sheet. In the course of their studies, they have discovered that such a desired stencil sheet is attained by superposing a functional layer (M) possessing specific properties found necessary during the course of plate making and printing desirably on either of the opposite surfaces of a specific peeling layer (P), further superposing a plate-making supporting layer (S) on the resultant composite of layers as an outermost layer contiquous to the functional layer, and joining the layers by application of heat and pressure. This invention has been perfected based on this knowledge.

To be more specific, this invention is directed to a multilayer film structure comprising a multilayer film obtained by superposing a specific functional layer by coextrusion and costretching on each of the opposite surfaces of a specific peeling layer and a plate-making supporting layer on either or both of the opposite surfaces of the multilayer film, contiquously to the functional layer and to a method for the production of a plate-making stencil sheet, by the peeling of the functional layer and the supporting layer of the laminate, from the peeling layer.

More specifically, this invention provides a high-sensitivity thermosensitive plate-making quality multilayer film which is characterized by the fact that the functional layer consists of a thermoplastic resin layer exhibiting thermal shrinkage ratio of at least 30% and a thermal shrinkage value of at least 50 g/mm$^2$ and possessing a thickness in the range of 0.1 to 12 $\mu$m and the peeling layer is formed of a thermoplastic resin containing at least one release agent and differing from the resin of the functional layer. This invention also provided a stencil sheet produced from the film and which is used for plate making. Further, this invention provides a method for the production of the stencil sheet.

It has been found that the thermosensitive perforating stencil sheet obtained by attaching the porous supporting member to the costretched multilayer film consisting of the functional layer and the peeling layer and subsequently peeling the peeling layer is notably improved in terms of the efficiency of lamination of the film and the resistance of the plate-making stencil sheet to the phenomenon of curling over the countertype obtained by the lamination of single functional layers. Generally when the film particularly with high perforation sensitivity is left standing for a long time especially at a relatively high temperature, it tends to curl and, in an extreme case, induce separation of the functional group through delamination. This is mainly because the functional layer is likely to curl instantaneously and immediately after the lamination due to the tension exerted upon the film during the course of winding, whereas the porous supporting member kept in close contact therewith is incapable of following this inclination.

Generally, to preclude this problem, the practice of improving the dimensional stability of the film to resist the adverse effect of aging by heat setting the film, for example, has been in vogue. This practice, however, is incapable of completely precluding the phenomenon of curling because the dimensional change with age is caused by the spontaneous change of volume and the crystallization of the polymer itself.

The inventors have made various studies on this point, to find that generally desirable results are obtained by allowing the superposed composite of a plurality of layers inclusive of the functional layer in large collective thickness to be laminated with the supporting member and peeling the specific peeling layer from the produced film and that still better results are obtained by carrying out the costretching of the multilayer film in such a layer structure under such stretching conditions that the specific peeling layer contiguous to the functional layer is allowed to impart to the functional layer a compressive force proper for the functional layer. It has been further found that the aforementioned problem is virtually completely prevented by subjecting the stretched costretched film to a suitable heatsetting treatment thereby imparting to the functional layer a compression enough to compensate the shrinkage the functional layer is destined to sustain after the stretching.

In a preferred embodiment of this invention, the costretched multilayer film containing at least one functional layer and at least one peeling layer is characterized by the fact that the functional layer consists of a thermoplastic resin layer exhibiting a thermal shrinkage ratio of at least 30% and a thermal shrinkage stress of at least 50 g/mm$^2$ and possessing a thickness in the range of 0.1 to 12 $\mu$m and the peeling layer is capable of exerting upon the functional layer at least on one direction thereof a compression strain in the range of 0.05 to 10%. The high-sensitivity thermosensitive multilayer film provided by this invention, therefore, is such that the plate-making stencil sheet is vested with resistance to the phenomenon of curling after it is laminated with the supporting member.

DETAILED DESCRIPTION OF THE INVENTION

The term "functional layer" as used in the present invention refers to a resin layer adapted to record information therein by the perforation of pertinent lettering or image by virtue of the thermosensitive property of the resin. In the case of the stencil printing, for example, the functional layer constitutes itself a resin layer which is intended to form a plate required, during the course of printing, to produce desired lettering, symbols, a photograph, or patterns on a surface given to be printed. Generally, this layer is desirably formed of a substantially amorphous thermoplastic resin. The thermoplastic resin which inherently has relatively high crystallinity and which, in the eventually formed multilayer film, assumes relatively low crystallinity is embraced in the resin of the functional layer contemplated by this invention. The material for the functional layer, therefore, may be amorphous or crystalline thermoplastic resin. The state of the resin in the finished film, is required to be in a substantially amorphous state exhibiting crystallinity of not more than 30%, desirably not more than 20%, and more desirably not more than 10% as measured by the density method. Particularly desirably, the material for the functional layer is synthetic resin which, in a thoroughly annealed and equilibrium states exhibit the crystallinity mentioned above as determined by the DSC method. Most desirably, this material is a resin which is constantly amorphous under ordinary conditions of production.

The thermoplastic resins which answer the description given above include copolymerized polyester type resins, polyamide type resins, ethylene-vinyl alcohol type copolymers, polycarbonate type resins, copolymerized polystyrene type resins, acrylic type resins, vinyl chloride type resins, vinylidene chloride type copolymer resins, and polypropylene type resins, for example. These resins may be used either singly or in the form of a combination of two or more members (as a mixture or multilayer composite). These thermoplastic resins may be used a mixed with other polymers, oligomers, plasticizers, etc. The term "copolymerized polyester type resin" as used herein means what comprises two or more different species of either or both of the dicarboxylic acid moiety and the diol moiety of a polyester. Where different species of the dicarboxylic acid moiety are used, combinations of terephthalic acid with other dicarboxylic acids such as, for example, aromatic dicarboxylic acids represented by isophthalic acid, phthalic acid, and 2,6-naphthalenedicarboxylic acid, aromatic dicarboxylic acids containing in the aromatic rings thereof substituents not contributing to the reaction of esterification, and aliphatic dicarboxylic acids represented by succinic acid and adipic acid are conceivable. Two or more members selected from the group of dicarboxylic acids just mentioned may be used as the two or more species under discussion. Where different species of the diol moiety are used, combinations of two or more members selected from the group consisting of ethylene glycol, propylene glycol, 1,4-butane diol, 1,5-pentane diol, 1,6-hexane diol, neopentyl glycol, polyethylene glycol, polytetramethylene glycol, and cyclohexane dimethanol, diols such as 1,4-naphthalene diol which possess an aromatic substituent, and diols possessing a bis-phenol ring, and other known diols are conceivable. One preferred copolymerized polyester type resin is what is obtained by preparing a diol moiety consisting mainly of ethylene glycol and additionally containing not more than 40 mol %, desirably 20 to 40 mol %, and more desirably 25 to 36 mol %, of 1,4-cyclohexane dimethanol and subjecting this diol moiety to polycondensation with a dicarboxylic acid moiety consisting mainly of terephthalic acid. Preferably, the raw material thus prepared in a thoroughly annealed and equilibrium state exhibits crystallinity of not more than 20% as determined by the DSC method. The crystallinity is desired to be not more than 20%. The material is desired to be in a substantially amorphous state (with crystallinity of not more than 10%), preferably a completely amorphous state.

Polyester which is not copolymer can be used as the functional layer (M) by making it a film with crystallinity controlled in above-mentioned range.

One typical copolymerized polyester type resin answering this description is obtained by preparing dicarboxylic acid moiety consisting mainly of terephthalic acid and a diol moiety consisting of about 70 mol % of ethylene glycol and about 30 mol % of 1,4-cyclohexane dimethanol and copolymerizing these moieties.

The polyamide type resins which are usable herein include nylons 6, 66, 6-10, 11, and 12 and copolymerized nylons 6-66, 6-66-610 and 6-66-612, for example. Among other polyamide type resins mentioned above, the copolymerized nylons prove particularly desirable. Further, these polyamide type resins copolymerized with a small amount of an aromatic dicarboxylic acid such as, for example, terephthalic acid, isophthalic acid or phthalic acid or an aromatic dicarboxylic acid containing a substituent making no contribution to the reaction of polymerization are also usable.

In these copolymers, those which are obtained by suitably copolymerizing the aforementioned aromatic dicarboxylic acids prove desirable because they possess a rigid portion (effective in suitable improvement of the glass transition point) in the molecular structure and those obtained by copolymerizing a hydrocarbon moiety abounding with branches or a moiety possessing a saturated cycle or a polar group prove desirable because they are effective in lowering crystallinity and enhancing modulus of elasticity. With respect to the crystallinity, the rule already prescribed for the polyesters also applies to these copolymers. The total proportion of such comonomers is generally not more than 30 mol %, preferably not more than 20 mol %.

The ethylene-vinyl alcohol copolymer is desired to possess an ethylene unit content in the range of 20 to 50 mol %, preferably 30 to 45 mol %. The composition obtained by modifying the copolymer by incorporation therein of not more than 40% by weight of at least one resin selected from the group consisting of nylon type resins, polyester type resins, and ionomer type resins is also usable.

The polycarbonate type resins are desired to use monomers likely to lower a softening point as compared with the conventional monomers or incorporate such monomers by copolymerization. Optionally, they may be produced in a form containing 5 to 40% by weight of other film-forming polymer.

There are times when a polypropylene type polymer in the form of film small thickness.

The copolymerized polystyrene type resins which are usable herein include those using acrylonitrile, acrylic esters, and diene type monomers as comonomers, for example. Among other copolymerized polystyrene type resins mentioned above, those incorporating therein acrylic esters by copolymerization prove particularly desirable in terms of sensitivity. In all of the thermoplastic resins mentioned above, the copolymerized polyesters prove particularly desirable in the sense that they possess sensitivity, strength, resistance to the impact of printing, and resistance to solvents in a balanced state.

Optionally, the thermoplastic resins of varying groups mentioned above may each incorporate therein not more than 50% by weight, based on the total amount of resin, of other polymer or oligomer.

They are also allowed to incorporate therein, as occasion demands, various additives, for example, fine powder of macromolecular compound, antioxidant, thermal stabilizer, plasticizer, macromolecular plasticizer, surfactant, slip additive, adjuvant, coloring agent, light-absorbing substance, filler of small specific heat, filler as good heat conductor in respective amounts incapable of impairing the properties required of the functional layer. Concrete examples of the additives are silicones (liquid or particulate polymer), fluorine type polymer powder, silica, talc, calcium carbonate, carbon, graphite, alumina, various metals, and powdered oxides of such metals measuring 0.01 to 8 $\mu$m in average particle diameter. The known monomers possessing such functions may be grafted to the resin of the functional layer (M) or to the surface region of the functional layer (M).

When the plate is made by the use of a semiconductor laser or LED array, for example, the thermoplastic resin incorporating therein a light-absorbing substance, for example, carbon, graphite, metal oxide, or coloring agent among other additives mentioned above manifests heretofore unattainable outstanding effect and, as a synergistic effect with the specific polymer, a highly desirable perforating property.

The thermoplastic resin to which above additives are added has same excellent effect regarding the extremely high speed plate-making which uses a solid laser, gas laser and others.

Further, the thermoplastic resin of which the functional layer is made is desired to possess a Vicat softening point measured in accordance with ASTM D-1525 (under a load of 1 kg at a temperature increasing rate of 2° C./minute) in the range of 30° to 150° C., desirably 40° to 130° C., and more desirably 50° to 120° C. where the high performance in perforation is utilized to advantage.

The thermoplastic film described above is usable not only for the thermosensitive plate-making stencil sheet but also as a paper for digital deta recording and as a material for discs, sheets, and tapes or recording devices. The material which has been perforated may be used as a filter material, a respiratory penetrating material, or a hygienic material, for example.

The functional layer of this invention is required to possess a modulus of tensile elasticity of at least 20 kg/mm$^2$, desirably not less than 30 kg/mm$^2$, more desirably not less than 50 kg/mm$^2$, still more desirably not less than 70 kg/mm$^2$, and most desirably not less than 100 g/mm$^2$. If the functional layer to be used possesses a modulus of tensile elasticity short of the lower limit mentioned above, there ensue many disadvantages that the film betrays weakness of nerve, the stencil sheet is so deficient in workability that it sustains elongation or fracture during the separation of the functional layer and the peeling layer, for example, the stencil sheet in storage is suffered to curl or delaminate with elapse of time, the film undergoes deterioration of dimensional stability or deformation or adhesion due to the pressure exerted during the course of plate-making step, and the stencil sheet suffers from such adverse phenomena as elongation and fracture during the course of printing.

The modulus of tensile elasticity is determined by the method specified in ASTM D 882-67 and is reported on the basis of the stress for 2% elongation taken as a modulus of 100%.

The functional layer is further required to possess a thermal shrinkage stress value of at least 50 g/mm$^2$, desirably in the range of 75 to 1,200 g/mm$^2$, and more desirably in the range of 100 to 1,000 g/mm$^2$.

The thermal shrinkage stress value is determined by cutting a strip 10 mm in width from a sample film containing the functional layer, setting the strip of film in place as kept taut with the opposite ends thereof nipped in chucks each fitted with a strain gauge and separated from each other by a distance of 50 mm, immersing the sample film in silicone oil heated to a varying temperature, and detecting the stress generated consequently in the sample film. The value of stress is taken at the end of 10 seconds immersion in the silicone oil when the oil temperature does not exceed 100° C. and at the end of 5 second immersion when the oil temperature exceeds 100° C. For the uniaxially stretched film, the value of stress is taken in the direction of stretching. For a biaxially stretched film, the average of two values of stress taken in the longitudinal and lateral direction is recorded. (This method of reporting will apply invariably hereinafter.) For the sake of performance, the film is desired to be biaxially stretched. The film is rated as conforming to the present invention so long as some if not all of the values of shrinkage stress taken at varying temperatures fall in the range defined above. The shrinkage stress value in the aforementioned range is desired to be manifested at a temperature in the range of 60° to 150° C., desirably 60° to 140° C., more desirably 70° to 120° C., and most desirably 70° to 110° C. The lower limit, 50 g/mm$^2$, fixed for the thermal shrinkage stress value constitutes itself an essential basic property for efficient perforation to be made in the paper. If the thermal shrinkage-stress value is smaller than this lower limit, the efficient perforation is, for example, not easily obtained by the thermal head method. If this value exceeds 1,200 g/mm$^2$, the perforation tends to produce unduly wide bores, the film sustains strain, the paper curls, and the resolution is liable to degrade. If the shrinkages stress value is manifested at an unduly low temperature, there arise disadvantages that the resolution is degraded and the paper tends to curl because the dimensional stability is degraded and the perforation produces excessively wide bores. If the value is manifested at an unduly high temperature, there ensues a disadvantage that the sensitivity of perforation is degraded.

The film is required to possess a thermal shrinkage ratio of not less than 30%, desirably in the range of 30 to 90%, and more desirable in the range of 40 to 80%. This thermal shrinkage ratio is determined by cutting from a given film a sample of the square of 50 mm, placing the sample film in a constant temperature bath set at a prescribed temperature, treating it therein for 10 minutes in a state whereby it is allowed to shrink freely, determining the amount of shrinkage of the sample, and calculating it in percentage based on the original size.

The thermal shrinkage ratio in the aforementioned range is desired to be manifested at a temperature in the range of 60° to 170° C., desirably 60° to 160° C., more desirably 60° to 150° C., and most desirably 65° to 140° C. If the thermal shrinkage ratio is less than 50%, the efficient perforation is not easily obtained, the sensitivity degrades, and the dimensional stability and the resolution are likely to decline. Conversely, if the thermal shrinkage ratio exceeds 90%, the resolution and the dimensional stability are impaired and the stencil sheet tends to curl because the perforation produces unduly wide bores and the film sustains strain. If this thermal shrinkage ratio is manifested at an unduly low temperature, the film assumes inferior dimensional stability and the stencil sheet tends to curl. If the ratio is manifested at an unduly high temperature, there arises a disadvantage that the sensitivity of perforation is impaired.

The functional layer in the stencil sheet of this invention has a thickness in the range of 0.1 to 12 μm, desirably 0.3 to 8 μm, and more desirably 1 to 6 μm. If this thickness is less than 0.1 μm, the produced paper does not suitable for practical use because it is difficult to handle, deficient in strength, likely to produce excessively wide bores in preforation, and apt to sustain fracture during the course of perforation and exhibit insufficient resolution. Conversely, if the thickness exceeds 12 μm, the facility of perforation is lowered and the workability is degraded. When the plate-making operation is carried out by the thermal head method, the method using a semi-conductor laser of low output, or the LED array method at a high speed with a particularly low energy as one preferred manner of use, the functional layer is desired to have a thickness in the range of 0.3 to 5 μm, desirably 0.5 to 4 μm, more desirably 0.6 to 3 μm, and most desirably 0.7 to 2 μm.

The functional layer may be used, not in a state superposed on the porous supporting member, but in the form of a self-supporting structure obtained by being superposed on a peelable base sheet of irregular surface, perforated, and then peeled or in the form perforated as applied on a platen roll of irregular surface. In this case or in a case where the film is heated from inside as with a laser beam of high output or a LED array, the thickness of the functional layer is desired to be in the range of 5 to 12 μm, though it is not required to be specifically defined.

Generally, the functional layer in this invention is formed in a single-layer structure. Optionally, it may be formed in an at least two-layer structure by being superposed on one member selected from the group consisting of sensitizer layer, sensitivity adjusting layer, lubricant layer, hotmelt layer, antisticking layer, strength enhancing layer, dimensional stabilizer layer, and optical perforation layer.

The peeling layer in the stencil sheet of the present invention is required primarily for the impartation of highly desirable properties to the stencil sheet during the course of the stretching step. It is further useful for ensuring efficient transfer of additives to the functional layer as well as for protecting the surface of the functional layer and reinforcing the stencil sheet to withstand the impacts of handling and fabrication. It is destined to be peeled after the lamination of the film with the supporting member is completed or immediately before the plate-making step. This peeling layer, therefore, is required to be formed of a material easily peelable from the functional layer. This peeling strength of the peeling layer from the functional layer should not be such that the peeling of the peeling layer occurs during the course of stretching, lamination, or other work of handling.

More desirably, the peeling layer fulfils the role of enabling the film to be smoothly stretched under the conditions under which the functional layer in its independent form would not be easily stretched and endowing the film with the pressive force for compensating the compressive force the stretched functional layer assumes with elapse of time.

When the single peeling layer is used, the material for the peeling layer is a polyolefin type resin which exhibits a Vicat softening point of not more than 120° C., desirably not more than 110° C., a crystal melting point not more than 160° C. and crystallinity in a throughly annealed state (determined by the DSC method) of not more than 60%. The polyolefin type resins which are usable herein include ethylene type polymers, copolymer consisting of ethylene and a monomer having a polar group, ethylene-α-olefin copolymers, propylene type copolymers of relatively low crystallinity, polybutene-1 type copolymers, and copolymers of various polyolefins, for example. When two or more such polyolefin type resins are used in the form of a mixture, the crystallinity is expressed as the sum calculated based on the mixing ratio of the component resins of the mixture.

Vicat softening point of a mixture is indicated at the value as mesured in the mixture condition.

A mixture consisting mainly of a polyolefin type resin may be usable as the material for the peeling layer, and the polyolefin type resin containing up to 50% by weight of other thermoplastic resin may be desirably usable as the material for the peeling layer. For example, a mixture consisting mainly of an ethylene type copolymer and incorporating therein 5 to 50% by weight of an ethylene-α-olefin elastomer copolymer and a mixture consisting of 100 parts by weight of the mixture just mentioned and 5 to 100 parts by weight of a polypropylene type polymer may be used. The ethylene type copolymers which are usable herein include ethylene-vinyl acetate copolymers (EVA) containing 5 to 25% by weight of vinyl acetate unit, copolymers of ethylene with a monomer selected from the group consisting of unsaturated aliphatic monocarboxylic acids and esters thereof, ionomer resins thereof, linear low-density polyethylene (LLDPE), very low-density polyethylene (VLDPE), and mixtures thereof, for example. More desirably, the ethylene type copolymers are LLDPE and VLDPE. It is provided, however, that the case in which a commercially available polypropylene type polymer of high crystallinity (exceeding 60%) and high Vicat softening point (higher than 120° C.) or a copolymer of the polypropylene type polymer with a small comonomer content for example, not more than 7% by weight of ethylene) is superposed as an independent layer direcly on the functional layer is excluded from the present invention. This is because the polymer or copolymer has no sufficient compatibility and bleeding with a liquid or pasty additive (incorporated in a ratio in the range of 0.3 to 3.5% by weight, for example) and tends to disrupt the interlayer structure of the laminate during the course of extrusion. Since permissible the amount of the additive is small, the uniformity of bleeding is impaired and the peeling property is jeopardized unless the heat-treatment is performed sufficiently. When the polymer or copolymer is used by the two-step bubble tubular stretching method, the nipped edges of the film before the stretching and the interface between the layers during the course of stretching are liable to sustain strain, possibly with the result that the separation occurs between other layers. This trend occurs particularly conspicuously when the stretching is temporarily performed by external force, for example performed by the tenter method. Especially in the sequential biaxial stretching method, separation between layers and non-uniform stretching are likely to occur in the portions nipped by the tenter clips.

The former is more desirable since the phenomenon like the latter seldom happens. Favorable Vicat softening point (measuring method is as same as for the functional layer material and the value measured in the mixture condition is indicated regarding the mixture) of above-mentioned thermoplastic resin used as the peeling layer is in the range from 30° to 120° C. If the Vicat softening point is lower than 30° C., the resin itself acquires an adhesive effect and renders the peeling difficult. If this temperature exceeds 120° C., the resin is troubled with the problem about the behavior of additive bleeding.

The functional layer can easily be partially peeled and damaged since it becomes too hard to absorb partial strain during various operations and moreover the whole multilayer body of the functional layer and the peeling layer becomes more subject to tearing.

The thermoplastic resin possesses in itself a satifactory stretching property and aids in the stretching of the other resin layer adjoining it and precludes the possible occurrence of the phenomenon of necking with the other resin layer in consequence of the stretching. While the costretching of the laminate is in process, the tight interlayer adhesive force manifests itself synergistically with the action of the additive to prevent the component layers from mutual separation. The synergistic effect is manifested in widening the range of optimum stretching conditions and facilitating the stabilization of the film. As the result, the stretching properties of the produced film such as the strength of the combined layers are improved and the stretching property of the functional layer is similarly improved.

The thermoplastic resin or composition of which the peeling layer is formed, in the light of the stretching property of the multilayer film incorporating the peeling layer by superposition, the compressive property of the peeling layer, the peeling layer's property with respect to bleeding of additive, and the affinity of the resin or composition for the other resin, is desired as a raw material to possess crystallinity of not more than 60% as determined by the DSC method. The costretching cannot be smoothly performed when the optimum stretching condition for the resin or composition of the peeling layer differs widely from that for the resin off which the functional layer is formed. It is, therefore, advantageous to use as the raw material for the peeling layer a resin which possesses a Vicat softening point not different by more than 100° C. from that of the resin for the functional layer.

Advantageously, the peeling layer is desired to be capable of exerting upon the functional layer in at least one direction thereof a compressive force producing a compression ratio in the range of 0.05 to 10%. This compressive force may be generated from the resin layer in an independent from, i.e. from the single-layer structure or from an arbitrary layer in the combination of two or more resin layers, i.e. the composite structure, in an arbitrary amount.

To cite a preferred embodiment, when a substantially amorphous resin is to be used for the peeling layer (P) of single structure, the resin in the form of an amorphous polymer or copolymer possessing a Vicat softening point not less than 10° C. lower than the stretching temperature, desirably higher than the stretching temperature, and especially at least not less than 10° C. higher than the stretching temperature forms a continuous phase. When a crystalline polymer is to be used, the resin in the form of a crystalline polymer or copolymer possessing a melting point 2° C.–40° C. higher than the stretching temperature and especially 5° to 30° C. higher than the stretching temperature or in the form of a mixture of two or more such polymers or copolymers is desired to form a thermoplastic resin composition of continuous phase. The resin of the continuous phase is desired to be in a proportion of not less than about 50% by volume, preferably not less than 60% by volume. The thickness of the peeling layer (P), on account of the relation with the bleed out of additive and the compressive force, falls generally in the range of 2 to 20 μm, preferably in the range of 3 to 12 μm. It is particularly important that the additive should be efficiently incorporated in the resin and allowed to bleed out advantageously therefrom. The modulus of tensile elasticity of the single layer is desired in the range of 5 to 60 kg/mm$^2$. If the modulus is less than the lower limit of this range, the produced peeling layer is excessively soft and disadvantageous is compressive force and the facility of peeling, for example. If the modulus exceeds the upper limit the peeling layer is notably deficient in the compressive force and the amount of compression, the facility of peeling, and the peeling during the course of stretching.

When the peeling layer is to be formed in a composite structure as generally desired, it is desirable to superpose on the peeling layer (P) at least two of the resin layers of severally different functions such as, for example, a resin layer serving the purpose of preventing the peeling layer from sustaining damage during the course of the peeling following the stretching step, a resin layer for effecting the transfer of additive bleed to the functional layer, and a resin layer for exertion of a proper compressive force on the functional layer. In consequence of the superposition of such resin layers, the proportion of additive bleed, the uniformity of peeling, and desirably the control of the compressive force can be facilitated. As one example of such combination, the $P_B$ layer which mainly combines flexibility, ability to contain the additive, and ability to effect additive bleed-out can be cited. The layer of the aforementioned thermoplastic resin or composition to be used in the single-layer structure mentioned above the ($P_{B1}$ layer: referred to hereinafter as "main peeling layer") and the layer of an olefin type polymer or copolymer possessing a melting point lower than the stretching temperature or a composition consisting mainly of the polymer or copolymer ($P_{B2}$ layer) are included in the category of $P_B$ mentioned above. Desirable concrete examples of the $P_B$ include the aforementioned EVA, ethylenically unsaturated monocarboxylic acids and derivatives thereof, and soft ethylene-α-olefin copolymers, for example. The layer of an amorphous polymer or copolymer possessing a Vicat softening point not less than 10° C. lower than the stretching temperature or a composition consisting mainly of the polymer or copolymer (included as $P_{B3}$ in the aforementioned category of $P_B$) is another example. The $P_B$ layer is desired to possess a modulus of tensile elasticity of not more than 50 kg/mm$^2$, preferably in the range of 5 to 40 kg/mm$^2$. If the modulus of tensile elasticity exceeds the upper limit of the range, the produced peeling layer proves unsatisfactory with respect to fitness to the functional layer (M), abnormal delamination during the course of fabrication, compressive force, amount of compression, behavior of additive bleeding, and facility of peeling of the thin functional layer (M). When the $P_B$ layer is formed so as to adjoin the functional layer (M), the interlayer disturbance with the functional layer (M) is prevented, the peeling is allowed to proceed smoothly at a high speed (100 to 200 m/minute) throughout the entire surface, and the possibility of the $P_A$ layer eating into the functional layer (M) and sustaining fracture the $P_A$ layer adjoin the functional layer (M) is precluded.

Then, the layer of a polymer or copolymer of the polypropylene type possessing a crystal melting point generally higher than the stretching temperature and a Vicat softening point of not lower than 120° C. or a composition consisting mainly of the polymer or copolymer is used as an assisted peeling layer ($P_A$).

Group (I) combination of layers in the multilayer peeling layer consists of at least one layer selected from among the aforementioned $P_{B1}$, $P_{B2}$, and $P_{B3}$ layers and at least one $P_A$ layer. As to the order of arrangement of component layers in this combination, the layers selected from among the $P_{B1}$, $P_{B2}$, and $P_{B3}$ are disposed on at least either, preferably both, of the opposite surfaces of the $P_A$ layer.

The favorable arranging example of layers in this case is to arrange the aforesaid resin or the composition of resin having softer modulus of tensile elasticity (5 to 50 kg/mm$^2$) than ($P_A$) layer at least on one side of the ($P_A$) layer possessing the harder modulus of tensile elasticity to be mentioned later and the reason for this is as described as follows. For the sake of ensuring the facility of peeling, the functional layer (M) is desired to adjoin the layers selected from among the $P_{B1}$, $P_{B2}$, and $P_{B3}$. Group (II) combination of layers consists similarly of at least one $P_{B1}$ layer and at least one layer selected from between the $P_{B2}$ and $P_{B3}$. The order of arrangement of the component layers in this combination is arbitrary. In one desirable arrangement, the resin layer capable of easily containing a release-promoting additive and readily bleed the contained additive is disposed to adjoin the functional layer. Concrete examples of the layer combination of Group (I) include $P_{B1}/P_A$, $P_{B2}/P_A$, $P_{B3}/P_A$, $P_{B1}/P_A/P_{B1}$, $P_{B2}/P_A/P_{B2}$, $P_{B3}/P_A/P_{B3}$, $P_{B1}/P_A/P_{B2}/P_{B1}/P_A/P_{B3}$, and $P_{B2}/P_A/P_{B3}$.

Optionally, other layers may be freely incorporated in the combinations mentioned above. Examples of the combination of Group (II) include $P_{B2}/P_{B-1}/P_{B3}/P_{B1}$, $P_{B1}/P_{B2}/P_{B1}$, and $P_{B1}/P_{B3}/P_{B1}$, preferably $P_{B2}/P_{B1}/P_{B2}$, $P_{B3}/P_{B1}/P_{B3}$, and $P_{B2}/P_{B1}/P_{B3}$. Optionally, other layers may be freely incorporated in the combinations mentioned above. The thermoplastic resin of which the assisted peeling layer ($P_A$) intended for reinforcement is formed is desired to possess a Vicat softening point of higher than 120° C., desirably not lower than 130° C., and more desirably not lower than 135° C., and modulus of tensile elasticity of not less than 50 kg/mm$^2$, and desirably not less than 70 kg/mm$^2$. Propylene type polymers, for example, are advantageously usable as such thermoplastic resins. The propylene type polymers may be homopolymers or copolymers or mixtures thereof with not more than 40% by weight of other polymers such as, for example, polybutene-1. Still other thermoplastic resins include polybutene-1 type polymers and copolymers methylpentene type polymers and copolymers and compositions thereof, and other similar arbitrary polymers copolymers and compositions thereof. In a desirable combination, these thermoplastic resins are used as mixed with 40 to 5% by weight of soft polymers or copolymers. The combination is especially effective in imparting a proper amount of compression to the functional layer (M). Among the soft polymers and copolymers usable for the mixture mentioned above, elastomeric resins and rubbery resins prove particularly desirable. They include such known resins as ethylene-α-olefin copolymers, for example. It is essential that the layer of such a soft resin should be capable of being costretched with the other component layers including the functional layer (M) and capable of effectively attaining the aforementioned impartation the amount of compression.

In the formation of the peeling layer by the union of the layer intended for reinforcement and the other layer, the adhesive strength between these layers should be greater than the adhesive strength between the functional layer and either of the two layers mentioned above.

The thicknesses of the component layers of the peeling layer of multilayer structure are not particularly restricted. Generally, the thickness of the $P_A$ layer is in the range of 0.5 to 20 μm, preferably 1 to 10 μm. The thickness of the $P_{B1}$ layer or the thickness of the layer selected from between the $P_{B2}$ and $P_{B3}$ expressed as a single thickness when the layers are used independently of each other or as a combined thickness when they are used in a multilayer state, generally falls in the range of 1 to 20 μm, preferably 2 to 10 μm, in the light of the relation with the additive bleedout and the impartation of desired compressive force.

The peeling layer contemplated by the present invention, whether in a single-layer structure or a multilayer structure, must incorporate therein a suitable release agent to ensure smooth removal of the peeling layer from the functional layer, prevent the peeling layer from being accidentally removed from the functional layer during any of the steps other than the step of peeling, and allow the entire process to proceed smoothly. The release agents which answer the description include esters of higher fatty acids with polyhydric alcohols, esters of higher fatty acids with polyoxyethylene type alcohols, nonionic surfactants such as polyoxyethylene alkyl ethers, higher alcohols and esters thereof, higher fatty acid amides, waxes, oligomers, silicone oils, fluorine type oils, and fluorosilicate type macromolecular compounds, for example. Of the release agents mentioned above, those which are assume a liquid state at normal room temperature and possess a viscosity of not less than 100 c. poises at 50° C. prove particularly desirable for the purpose of imparting a suitable peeling property. They are allowed to assume a pasty state at normal room temperature and desired to possess a melting point of not higher than 50° C. The viscosity may be that of a single release agent used alone or that of a mixture of two or more release agents used jointly. To the release agent mentioned above, an antistatic agent, an antisticking agent, etc., may be added independently of one another or jointly with one another.

The amount of the release agent to be added is generally in the range of 0.2 to 5% by weight, based on the total weight of the thermoplastic resin of which the peeling layer is formed. In the case of the peeling layer of multilayer structure, at least that of the component layers which adjoins the functional layer must incorporate therein the release agent in the amount specified above. The release agent incorporated in the prescribed peeling layer, after the peeling layer the peeling layer is superposed on the functional layer and the two a layers costretched, quickly bleeds to the surface of the peeling layer and facilitates the separation between the functional layer and the peeling layer. Even when this separation is automatically carried out at a high speed after the supporting member has been superposed on the functional layer, therefore, the film emanating from the peeling step can be taken out without entailing trouble of any sort. Since the peeling layer possessed suitable adhesive force, it is effective in precluding the otherwise possible accidental separation of the component layers during the course of production.

The test for peeling strength between the peeling layer and the functional layer is carried out by peeling a sample test piece in the T-shape pattern by the aforementioned tensile test method, with the speed of tension fixed at 200 mm/min [Japanese Industrial Standard (JIS) K 6854]. The peeling strength is generally not more than 2 g/cm of width, preferably not more than 1 g/cm of width. In the case of the peeling layer of multilayer structure, the peeling strength between the functional layer and the composite peeling layer as a whole is the same as that described above. Within the peeling layer, the peeling strength between the $P_B$ and $P_A$ layers must be greater than that between the functional layer and the $P_B$ layer so as to inhibit separation between the $P_B$ and $P_A$ layers. The peeling strength under discussion is desired to be not less than 5 g/cm of width, preferably not less than 10 g/cm of width. Where the separation is desired to proceed at high speed, the acceleration of the speed of separation is attained advantageously by incorporate in the peeling layer a mixture of an oleic acid monoglyceride and a polyglycerin monooleate (prepared in mixing ratio of former/latter in the range of 1:4 to 4:1) in a proportion in the range of 0.5 to 3.0% by weight, based on the total weight of the peeling layer.

The peeling layer of this invention, when necessary, may incorporate therein in addition to the release agent mentioned above various additives for improving the physical properties of the peeling agent and may further incorporate layer adjoining the peeling layer and modifying the surface property of the functional layer. For example, the incorporation of an amino-modified silicone, a mercapto-modified silicone, or an epoxy-modified silicone as an antisticking agent in a small amount (for example, 0.1 to 3% by weight) proves advantageous.

Further, the functional layer in the multilayer film of the present invention is required to exert upon the peeling layer in at least one direction thereof a compressive force producing compression strain suitable but not so large as to impair the planarity of the peeling layer. Preferably, the compressive force is exerted exerted simultaneously in the longitudinal and lateral directions. The expression "not impair the planarity" as used herein means that the functional layer of the film is not compelled by the compressive force to fold itself in a zigzagging force and entail the phenomenon of blushing. The amount of compression strain determined by the method to be described specifically hereinafter is required to be in the range of 0.05 to 10%, desirably 0.1 to 5%, and more desirably 0.2 to 3%. If this ratio of compression is less than 0.05%, the phenomenon of curling which possibly occurs after the multilayer film is superposed on the porous supporting member and then the peeling layer is peeled cannot be fully precluded. If the compression ratio exceeds 10%, the multilayer film itself succumbs to the phenomenon of abnormal peeling and entails the phenomenon of blushing and the functional layer suffers the planarity thereof to be impaired after the removal thereof from the peeling layer subsequent to the super-position thereof on the supporting membrane and, moreover, the plate eventually produced entails the disadvantage that the uniformity of quality is jeopardized and the plate itself curls toward the supporting member side. This amount of contraction of compression strain does not always equal the amount of contraction which occurs after the superposition. It is delicately affected by the elongation and the tension on the film side during the course of superposition, the elongation and the degree of shrinkage on the supporting member side, the amount of water absorbed, the hysteresis creep, and the conditions of adhesion. The determination of the amount of compression is carried out by stretching a given multilayer film under prescribed conditions, removing the functional layer from the stretched film in the manner to be described hereinbelow, and performing a pertinent measurement on the removed functional layer. The return of the functional layer to the original size after the removal from the film originates in the compressive force which the peeling layer exerts upon the functional layer after the stretching. Since the compressive force is primarily varied by the thickness of the peeling layer, the stretching conditions, and the amounts of resilient shrinkage occurring in the component layers after the stretching, the ratio of compression of the functional layer can be controlled by varying the thickness of the peeling layer of a single-layer structure or the thicknesses of the component layers of the peeling layer of multi layer structure or by adjusting the stretching conditions and the heat setting conditions, for example. The optimum magnitude of the amount of compression varies with the purpose for which the multilayer film is utilized or with the kind of the functional layer (M). In the case of a material of relatively low modulus of tensile elasticity or a soft material, for example, it is convenient to fix this magnitude at a slightly larger level. Generally, however, this magnitude is fixed in the aforementioned range. The stretching conditions for the multilayer film have a direct effect on the performance of the functional layer and can be controlled by the heat-setting conditions after the stretching. In this case, it is convenient to use fixed values and employ the temperature of the heat setting aimed at a fixed amount of relaxation as a factor.

The relation between the functional layer and the peeling layer with respect to thermal shrikage can be estimated by the determination of the temperature dependency of their elongation-contraction properties, namely the dependency of the ratio of shrinkage and the contractive stress. Desirably, the ratio of shrinkage of the peeling layer under the conditions of heat treatment must be greater than that of the functional layer. If this relation is reversed, the functional layer sometimes if not always exerts compression on the peeling layer. In this case, the resistance to the phenomenon of curling is rather jeopardized than improved.

It is, therefore, recommendable to control the compression ratio within the prescribed range while paying due consideration to the heat setting conditions and the amounts of shrinkage in the two layers.

The method to be adopted for the production of the multilayer film of this invention is not specifically restricted. The production can be carried out by any of the known methods generally adopted for the production of any ordinary multilayer film. For example, the production is attained by melting the raw materials for the functional layer and the peeling layer in separate extruding machines, coextruding the molten raw materials through annular or T-type multilayer dies, suddenly cooling the extruded sheets of molten raw materials, and stretching the cooled sheets by the tenter method or the bubble method. As to the stretching condition to be used in this case, the stretching temperature (namely, the temperature of the part at which the stretching is started) to be selected should be capable of imparting a prescribed orientation to the functional layer formed of the specific resin and the peeling layer of single-layer structure is formed of the aforementioned resin and caused to incorporate therein the additives found necessary. In the case of the peeling layer of multilayer structure, it suffices to select resins and a layer combination as described above and, for the particular one of the component layers which adjoins the functional layer, select a resin incorporating therein necessary additives.

The stretching temperature generally is in the range of 60° to 150° C., desirably 70° to 130° C., and more desirably 80° to 120° C. The stretching is desired to be performed biaxially at a ratio approximately in the range of 4 to 49 times, preferably 8 to 36 times, the original surface area. In this case, the material and thickness of the peeling layer are designed and the stretching conditions and the heat setting conditions are controlled so that the peeling layer will exert a prescribed compressive force upon the functional layer. In the various methods available at all for the production, the bubble method proves available at all for the production, the bubble method proves particularly advantageous in the sense that it is capable of easily producing a high-sensitivity film by a simultaneous biaxial stretching operation at a high speed of transformation efficiently in a large volume. In the case of the tenter method, since the stretching is effected by applying an external force to the terminal parts of the superposed layers, the stretching is likely to entail mutual deviation between the layers and abnormal peeling. These abnormal phenomena occur particularly conspicuosly in a sequential biaxial stretching operation and the produced film is short of the tolerable level for this invention. The allowable ranges for the stretching conditions (temperature, speed, and stretching ratio), therefore, are narrowed, rendering the production of a film of desired properties difficult. It also becomes difficult to ensure efficient impartation of peeling property, compressive force, and amount of compression. The bubble method are not troubled with these adverse phenomena because the stretching force generated by the internal pressure is allowed to act uniformly on the entire surface.

The multilayer film of this invention consists of at least one functional layer and at least one peeling layer. This peeling layer may be in a single-layer structure or in a multilayer structure.

For the multilayer film consisting of functional layers (abbreviated as M) and peeling layers (abbreviated as P) of single-layer structure, the following typical layer combination are conceivable.

M/P, M/P/M, M/P/M/P, M/P/M/P/M,
M/P/M/P/M/P/M, ...

Among the layer combinations mentioned above, those which have a M layer on each of the opposite outer surfaces prove desirable and those which have a symmetric configuration prove more desirable.

For the multilayer film whose peeling layer (P) assumes a multilayer structure consisting of main peeling layers ($P_{B1}$, $P_{B2}$ and $P_{B3}$) of different functions and a assisted peeling layer ($P_A$) the following typical layer combinations are conceivable: A combination having a M layer attached to at least one, preferably both, of the opposite surface layers of the aforementioned layer combination of Group (I) for the peeling layer, a combination having a M layer inserted between two adjacent inner layers, and a combination having M layers attached one each to the opposite surface layers and a M layer inserted between two adjacent inner layers. The same combination are also conceivable for the layer combination of Group (II) mentioned above.

This multilayer film is desired to have a layer combination in which at least either, preferably both, of the outermost layers thereof is a functional layer. For the purpose of minimizing the phenomenon of curling in the entire film, the film inclusive of the opposite surface layers and the intermediate layers is desired to have a symmetrical layer structure.

The production of the high-sensitivity thermosensitive plate-making stencil sheet by the use of the multilayer film of this invention is attained by superposing plate-making quality supporting member at least one of the functional layers of the multilayer film and separating the film along the interface between a functional layer and a peeling layer thereof thereby giving rise to the paper aimed at. Desirably, the production is effected by preparing the multilayer film in such a manner that the peeling layer will exert the prescribed amount of compression on the functional layer, effecting the superposition of the supporting member as described above, and performing the aforementioned separation of the film thereby relieving the functional layer (M) of the compressive force.

As the supporting layer for the plate-making stencil sheet of this invention, an ink-pervious porous film or sheet adapted to meet the purpose for which the paper is intended or a base paper possessing a rugged surface can be used. The supporting layers of the former class include Japanese paper and plain paper of the form of onion paper having a basis weight in the range of 3 to 15 g/m$^2$ and similar sheets of synthetic fibers, natural fibers, regenerated fibers, and mixtures thereof, for example. A mesh-screen type woven fabric formed of long fibers is another example. Desirably, the mesh-screen type woven fabric has a mesh size approximately in the range of 50 to 500 meshes, preferably 70 to 300 meshes. The base paper possessing a rugged surface convenient for the sake of perforation may be cited as the specific supporting member, which is used in combination with a functional layer of relative large thickness approximately in the range of 6 to 18 $\mu$m with a peeling layer, for example, to form a laminate (for perforation), then the base paper with the functional layer peeled from the peeling layer, the functional layer perforated with dot-like discrete holes arranged in a prescribed pattern, and put to use in printing in a state supporting thereon given information.

The base paper thus used has minute projections and depressions, speciffically projections, arranged regularly. The projections have a cross section of the shape of a circle, a rectangle, an ellipsis, a line, or continued meshes. These projections may be randomly laid. Preferably, they are regularly arranged. Generally, these projections have a height of not than 15 $\mu$m, desirably not less than 25 $\mu$m; and more desirably not less than 30 $\mu$m. In the case of discrete projections, the individual projections have a size in the range of $2.5 \times 10^{-5}$ to $1.44 \times 10^{-2}$ mm$^2$. The proportion of the available surface area of the projections is approximately in the range of 1 to 35%. These projections constitute themselves the portions of the base paper to be joined by lamination with the functional layer in a readily separable state. The projections may be formed of the same material as the base paper of sheet or film by emboxing, for example. Otherwise, they may be formed by the printing or resist method of patterning on the surface of film, sheet, paper, or fiber.

The supporting member described above is joined with the functional layer by the use of an adhesive agent or by thermal fusion or some other means. The adhesive agent to be used for the lamination is not specifically restricted. Any of the conventional adhesive agents may be used. The adhesive agents which are usable herein include an adhesive agent to be used as dissolved in a solvent, an adhesive agent of the form of emulsion altex, an adhesive agent of a hot melt form, a powdery adhesive agent, adhesive agents of reaction hardening type resorting to the action of water, the mixture of two components, or the exposure to ultra-violet light or electron beam, and adhesive agents relying on the combination of such functions, for example, an adhesive agent of hot melt type having the consistency of emulsion, an adhesive agent vested with the function of emulsion, an adhesive agent vested with the function of emulsion in combination with the function of curing agent, and an adhesive agent formed by combining a solution of adhesive agent in a solvent and a reaction hardening type adhesive agent. One member or a mixture of two or more members selected from the group of adhesive agents mentioned above may be selected to suit the purpose.

The amount of the adhesive agent to be used, as reduced to the solids content after the adhesion, is generally in the range of 0.1 to 8 g/m$^2$, desirably 0.2 to 5 g/m$^2$, and more desirably 0.3 to 3 g/m$^2$. The method for the lamination is not specifically restricted. Any of the methods generally used for lamination may be selected to suit the kind of the adhesive agent to be used. This lamination is only required to join the desired supporting member to the thermoplastic resin film as the outermost layer of the multilayer film. For the application of the adhesive agent, a coating roll provided with a doctor knife is used, for example.

In the present invention, the multilayer film is superposed on the prescribed supporting layer. This supporting layer must adjoin the functional layer constituting itself the outermost layer of the multilayer film. When the multilayer film is so formed as to comprise two or more functional layers, a plurality of plate-making stencil sheets can be obtained from one multilayer film. When the multilayer film possesses a layer structure in which functional layers (M) and peeling layers (P) are alternately arranged in this manner, M/P/M/P/M/ . . . , and at least either of the opposite outermost layers is a functional layer (M), a plurality of plate-making quality papers can be obtained at one time by joining the supporting member (S) to the functional layer (M) constituting itself the outermost layer, separating the superposed composite (plate-making stencil sheet consisting of the supporting layer and the functional layer, removing the peeling layer (P), performing the procedure described above on the functional layer (M) possessing an exposed surface, and sequentially repeating the procedure of peeling the superposed composite (plate-making stencil sheet) consisting of the supporting layer and the functional layer.

For the plate-making stencil sheet of this invention, the following six cross-sectional structures;

S/M/P/M

S/M/P/M/S (wherein $P=P_{B1} \cdot P_{B2} \cdot$ and $P_{B3}$ as defined previously, preferably $P_{B1}$) where the peeling layer has a single-layer structure and S/M/Px/Py/M S/M/Px/Py/M/S (wherein $x \neq y$, x is selected from B1, B2, and B3, and y is selected from B1, B2, and B3) and S/M/Px/Py/Pz/M S/M/Px/Py/Pz/M/S (wherein $y \neq x$ or z, z is selected from B1, B2, and B3, and y is selected from A, B1, B2, and B3, and z is selected from B1, B2, and B2) where the peeling layer has a multilayer structure. Here, S stands for a porous supporting layer. The structures enumerated above omit the case in which any functional layer (M) occurs as an inner layer.

In accordance with the present invention, the multilayer film comprising the functional layer and the peeling layer is first prepared, and the paper-making stencil sheet aimed at is produced by laminating the supporting layer superposed on one of the opposite surfaces, or sequentially or simultaneously on both of the opposite surfaces and peeling from the peeling layer.

The thermosensitive plate-making stencil sheet to be obtained by the method of this invention has a flat smooth film surface, has the freedom from scratches, wrinkles, warp, strain, and fractures as compared with the countertype obtained by the conventional method, and enjoys high sensitivity and high resolution and uniform quality. It can be advantageously utilized in a plate-making system which perforates information at a high speed with a low energy source.

Further, the method of this invention is advantageous in that (1) it enables the supporting member to be uniformly superposed by lamination on a film of small thickness approximately in the range is not attained by the conventional method, (2) The lubricating treatment and the antistatic treatment for the film surface of the plate-making quality paper can be automatically effected by the bleading from the peeling layer, (3) the phenomenon of curling otherwise generated in the plate-making quality paper owing to the time-course in consequence of the enhancement of sensitivity can be percluded substantially completely, (4) a plurality of plate-making quality papers can be obtained from one multilayer film, (5) the multilayer film having functional layers superposed one each on the opposite surfaces of the supporting member each through the medium the peeling layer can be used in its unaltered form as a finished product and is only required to be separated immediately prior to use and, therefore, the plate-making quality papers obtained therefrom the multilayer film are perfectly free from the phenomenon of curling, scratches, and dirt, (6) the lamination is carried out inexpensively, and (7) the peeling layers removed from the multilayer film can be recovered for reuse.

Details of the present invention will be explained below by examples, but the present invention shall by no means be limited by these examples.

The measurement of the physical properties in each example was done by the following method.

(1) Crystallinity

① Crystallinity as of raw material of polymers consisting of the film was measured through the method of heat of fusion, of which simple method is to measure melting point of the particular sample at rising temperature of 10° C./min. by using DSC method, obtain heat of fusion ($\Delta H$) from area ratio between the sample and the standard sample of indium with known heat of fusion, and calculate crystallinity by following formula.

$$\text{crystallinity} = 100 \times \Delta H / \Delta Hm$$

In above formula $\Delta Hm$ is heat of fusion of crystal component of the sample itself and is the value from literature (Kagaku Binran second edition-application, edited by Japan Chemistry Association, P336-841)

② Crystallinity of fabricated film in the stretched form was measured by obtaining each crystallinity of raw material not in the form of the film by density method, drawing calibration curve and calculating with this calibration curve ignoring error caused by difference in crystal structure. Basic data on relationship between density and crystallinity was according to the above-mentioned literature while that for copolymer was based on the value when not crystallized as adjusted appropriately.

(2) Perforating sensitivity

Perforating sensitivity is determined by printing pressure energy (mjoule) per dot when given plate-making stencil sheet is perforated at regulated printing pressure energy by line-type thermal head of plate-making part of plate-making type automatic printer. Type 007 DPF manufactured by Riso Kagaku Sha, optical density of solid black part (stable part of 5 mm square solid black part of the original which is printed under standard conditions i.e., medium point of original density measure by making plate at original select letter mode) is measured by handy-type density meter DM-800 manufactured by Dainippon Screen Manufacturing Co. Ltd., and its value is not less than 1.0 when standard black sample (optical density 1.72, DIN 16536, type 47 B/P) is blank.

(3) Curling degree

A given film sample is placed on flat glass board, a Japanese paper of the form of onion paper made of polyester with good dimentional stability (METSUKE 12 g/m$^2$) is glued to the film by using 10 wt % methanol solution of vinylacetate type glue, and after drying, the sample is fixed with inside measurement 10 cm × 10 cm frame. Two cutlines are made on the film dinagnorally so that the two lines cross at right angle, the sample is left for one month at a given temperature, it is conditioned in the room with constant temperature of 23° C. and humidity 50% RH for approximately 2 hours, and curling degree R is calculating by measuring semidiameter r(mm) of the curl in vertical direction and horizontal direction and applying formula below.

$$R = 100/r$$

Though this curling degree should ideally be 0; practical allowable limit is about 7 to 8 and value more than 15 will made the product impractical. Delamination phenomena can afterwards be seen if the curling degree exceeds 20.

(4) Compression volume

Compression volume of the functional layer is determined by percentage of length of the film stretched to that of original mutilayer film when a given mutilayer film which is cut out to be 1000 mm×50 mm is aged for 24 hours in the room with constant temperature of 23° C. and relative humidity of 50% RH and measure functional layer after peeling from the peeling layer.

Below are resins used in each example for the functional layer and the peeling layer.

Functional layer ($M_1$): mixture of substantially noncrystallistic copolymer polyester which is obtained from mixed diol consisting of terephthalic acid, 1,4-cyclohexane dimethanol 30 mol % and ethylene glycol 70 mol % and of which 82° C. of Vicat softening point, 1.27 g/cm³ of density limiting viscosity of 0.75 and silica with size range not more than 8.0 μm and average particle size of 4.5 μm at 3000 ppm concentration.

Functional layer ($M_2$); Non-crystallistic copolymer polyester which is obtained from mixed dicarboxylic acid consisting of terephthalic acid 80 mol % and isophthalic acid 20 mol % and mixed diol consisting of ethylene glycol 90 mol % and 1.4 cyclohexane dimethanol 10 mol %.

Functional layer ($M_3$); Copolymer polyester with 0.68 of limiting viscosity and 11 cal/g of crystal fusion energy by DSC method when material is sufficiently annealed.

Functional layer ($M_4$): Copolymer Nylon with crystallinity 8% and fusion point 170° C. which is obtained by known method from ε-caprolactam, hexamethylenediamine and nylon 6 and nylon 66 components of adipic acid part of which is replaced by terephthalic acid as supplementary copolymer content i.e. first make components to be nylon 6 65 mol %, nylon 66 35 mol % and then replace terephthalic acid for adipic acid 40 mol % in the said 66 component.

Functional layer ($M_5$); Composition consisting of ethylenevinyl alcohol type copolymer (Vicat softening point; 125° C., glass transition point; 61° C.) 70 wt % of which ethylene unit content is 45 mol % and ionomer type resin (MMA content; 18 wt %, neutralization; 35%, Vicat softening point; 70° C.) 30 wt %

Peeling layer ($P_{B1}.1$); Mixture of very low density polyethylene 90 wt % of which melt index 3.3, density 0.906 g/cm³, fusion point 122° C., crystal fusion heat (ΔHu) measured by measurement device Perkin-Elmer Co., Ltd. type DSC-2DSC at rising temperature rate 10° C./min. and ethylene-vinylacetate copolymer 10 wt % of which vinylacetate unit content 10 wt %, melt index 1.0, Vicat softening point 81° C., fusion point 95° C.

Peeling layer ($P_{B2}.1$); Composition resin mixture with Vicat softening point 82° C. which consists of ethylene-vinylacetate copolymer 70 wt % of which vinylacetate unit content is 10 wt %, melt midex 1.0, Vicat softening point 81° C., and fusion point 95° C. and non-crystal ethylene-α-olefin copolymer elastomer 15 wt % of which density is 0.88 g/cm³, melt index 0.44, Vicat softening point 40° C., and ethylene-propylene copolymer 15 wt % to which ethylene 4 wt % is copolymerized randomly and of which density is 0.90 g/cm³, melt float 7, Vicat softening point 138° C., bending elastic modulus 110 kg/mm², fusion point 143° C., 3 wt % of mixture of oleic acid monoglyceride and diglycerol monooleate at ratio of 2 to 1, as release agent, and 1.5 wt % of an amino-modified silicone oil as an antisticking agent.

Peeling layer ($P_{B1}.2$); Composition consisting of very low density polyethylene of which melt index is 1.0, density 0.890 g/cm³, fusion point 117° C., crystal fusion heat (ΔHu) 4.0 cal/g, and Vicat softening point 60° C. and 3 wt % of mixture of weight ratio 2 to 1 of oleic acid monoglyceride and diglycerol monooleate as release agent.

Peeling layer ($P_{B1}.3$); Composition consisting of very low density polyethylene used in aforementioned peeling layer ($P_{B1}.2$) mixed with ethylene-vinylacetate copolymer used in aforementioned peeling layer ($P_{B1}.1$) at weight ratio of 8 to 2 and equal amount of release agent and stick inhibitor used in the peeling layer ($P_{B2}.1$).

Assisted Peeling layer ($P_A.1$); mixture of 80 wt % of ethylene-propylene copolymer of which density is 0.90 g/cm³, melt float 7, Vicat softening point 138° C., bending elasticity 110 kg/mm², and fusion point 143° C. and to which 4 wt % of ethylene is copolymerized randomly, and 20 wt % of ethylene-α-olefin elastomer (density 0.88 g/cm³, Vicat softening point 40° C. max.)

Assisted Peeling layer ($P_A.2$); composition of ethylene-propylene copolymer used in aforesaid assisted peeling layer ($P_A.1$) mixed with vely low density polyethylene of which melt index is 1.0, density 0.890 g/cm³, fusion point 117° C., crystal fusion heat (ΔHu) 4.0 cal/g, and Vicat softening point 60° C. at weight ratio of 8 to 2.

EXAMPLE 1

Each of the functional layer ($M_1$), the peeling layer ($P_{B2}.1$) and the assisted layer ($P_A.1$) is fused by extruder and after extruding is completed so that structure of each layer may be $M_1/P_{B2}.1/P_A.1/M_1$ from ring shape multilayer die, the layers are quenched to become hardened through refrigerant. Tube shape original roll is according obtained.

Nextly this original roll is stretched to be bubble shape after stretched in two direction simultaneously at stretching temperature of 102° C. under the atmosphere so that resulted stretching rate may be 5.0 vertically and 5.0 horizontally and cooled by air at 20° C. Two edges of the film obtained above are slit and as result two films can be rolled by rewinders. Thus smooth stretching was conducted stably without shaking or puncture of bubble, and the film achieved is homogeneous. Furthermore no peeling (at niproll) occured between layers prior to stretching or no partial peeling phenomenon can be seen at all. Thickness of each layer of this multilayer film was 2/8/2/8/2 (μm). Compression volume of the functional layer was 1.1% on average of vertical and horizontal direction. $M_1/P_A.3/M_1$ which is combination of $P_A.3$ consisting of copolymer polypropylene only and layer $M_1$ saw a lot of bubble shaking and puncture and could not be stretched homogeneously. Partial peeling prior to stretching occurred particularly at a part which is nipped by and slippage between layers and peeling during stretching often took place. Because of interlayer disturbance between layers $M_1$ and $P_A.1$ one layer cuts into the other and thus phenomenon was after seen wherein layer $M_1$ was torn at time of peeling. Similar study was made as a comparative example on layer structure of $M_1/P_A.3/P_{B2}.1/P_A.3/M_1$. The result was of less quality compared to examples, and peeling phenomenon was apparent before and during stretching as seen in the previous comparative example as well as disorder between layer $M_1$ and other layer and a lot of tearing of layer $M_1$ at time of peeling.

As supporting member polyester fiber (fiber diameter 45 μm) with 150 mesh and secondly Japanese paper made of Manila hemp with Metsuke 8.7 g/m² was used while as an adhesive agent ethylene-vinylacetate copolymer type resin resolved in methanol was used to laminate the said supporting member to both sides of the said multilayer film. Amount of adhesive agent used here was 3.0 g/m³ in terms of solid content.

Lamination was smooth in any case and there was no wrinkle, cut, or curling at time of drying which allowed homogeneous treatment. Laminating body obtained is easy to handle, strong, while its layer $M_1$ is protected from stain or cut and it was free from curling phenomenon after peeling.

This laminating body allowed easy peeling and it was able to be as two stencil sheets.

The aforementioned layer $M_1$ was released and its property was analyzed. As result, tensile break strength was 18.2 kg/mm², tensile elongation at break 110%, modulus of tensile elasticity 220 kg/mm², shrinkage stress value 430 g/mm² (peak value at 85° C.), thermal shrinkage ratio 78% at 80° C. All above results are average of vertical and horizontal direction and as well as results shown in later discription.

Peeling between layer $M_1$ and $P_{B2}$-1 was easy with its peeling force 0.8 g/cm width which was appropriate. Adhesive strength between layer $P_{B2}$-1 and layer $P_A$-1 had level sufficient to allow no peeling.

Release agent made a right bleedout over interface with layer $M_1$ and provided good peeling effect as well as appropriate adhesiveness between layer $M_1$ and $P_{B2}$-1 to allow no break off of layers, wrinkle or float at all. For comparison test was done without release agent where layer $M_1$ was torn and peeling was not smooth. In this comparative example due to static electricity layers were subjected to dust, tearing, and wrinkle caused by spark. Use of release agent not only permitted stable peeling effect between layers and other aforementioned effects but also stopped the sticking problem of line-type thermal head of printer (phenomenon where film sticks to thermal head, tears or sees wrinkles, causing distortion of a image which is formed by perforating). while conventional commercial high crystalline polyester film (2 μm) is re-coated with stick preventive agent, production of the present invention has advantage in requiring no additional coating of stick preventive agent. Moreover $P_{B2}$-1/$P_A$-2 peeled off were recoverable and recycle was possible.

Nextly, thickness of layer $M_1$ was made at 0.5 μm and same test was conducted to show almost same property for film of said layer $M_1$. Compression ratio was 2.1% on average of vertical and horizontal direction. There was no problem whatsoever is lamination with a porous supporting member. This made it possible to smoothly manufacture stencil sheet with extremely thin functional layer $M_1$ which could not be considered before without causing wrinkle, cut or tearing. When thickness of layer $M_1$ was made at 10 μm and 12 μm, the film allowed homogeneous stretching and lamination compared with single $M_1$ layer film. Homogeneous stretching was not possible due to puncture or extremely uneven thickness when thickness of single layer film was not more than 8 μm.

Nextly non woven fablic made of polyester fiber with Metsuke 9.5 g/cm² used with the film consisting of aforementioned functional layer ($M_1$) which is 2 μm and 0.5 μm thick as supporting member, was laid on both sides of aforementioned multilayer film by methanol solution of ethylene-acetic acid vinyl copolymer type resin as adhesive agent. Amount of adhesive agent used was 3.5 g/cm³ in terms of solid content.

This operation for laminating layer was very smooth and such trouble as wrinkle, cut or curling did not occur at time of drying. The multilayer product obtained was easy to handle and possessed sufficient strength. No attachment of dust or cut was observed because its functional layer face was completely covered. Curling phenomenon didn't take place at this stage.

Following above operation both sides of this laminated member ware peeled from the peeling layer portion ($P_{B2}$-1/$P_A$-1/$P_{B2}$-1) at low tension of 2 g/cm width and at high speed of 200 m/min. The peeling was made without difficulties and desired stencil sheet was obtained.

Perforating sensitivity of the stencil sheet was measured to be at ultra sensitive level of 0.03 mjoule for 0.5 μm thick $M_1$, 0.04 mjoule for that of 1.0 μm thickness (the product obtained in the same way to possess all properties in most favorable range, and compression volume was 1.5%). Curling degree was also measured at aging temperature of 40° C. and 50° C. to show 0 for all products at 40° C. and 0, 0, and 2 respectively for products of various thickness at 50° C. In the purpose of comparison curling degree was measured when each of above layer $M_1$ was peeled to be one separate film and laminated to non woven fabric (Metsuke 12.0 g/m²) made of aforementioned polyester type fiber without causing wrinkle. The result was 8, 10 and 12 under aging at 40° C. and 25, 30, and 35 under aging at 50° C. while delamination phenomenon occurred when the stencil sheet using 1.0 μm and 2.0 μm. film was applied.

For further comparison a stencil sheet was manufactured by using one sheet of crystal polyethylene terephthalate film (crystallinity at density method; approx. 32%) as functional layer which was laminated with supporting member similar to the aforementioned. Perforating sensitivity of the stencil sheet was measured to be 0.12 mjoule for the one with 1.0 μm thickness and 0.13 mjoule for the one with 2.0 μm thickness. Curling degree in this example was 8 for 40° C. aging and 16 for 50° C. aging. From this result it can be concluded that stencil sheet produced with multilayer film of the present invention exibits much higher perforating sensitivity and much better curling resistant property after high temperature aging than the stencil sheet produced with commercial film.

EXAMPLE 2

Laminating film consisting of $M_1/P_{B2}$-1/$P_A$-1/$P_{B2}$-1/$M_1$ with respective thickness of 2/8/2/8/2 μm was manufactured in the same way as in example 1 except that resin consisting of layer $M_1$ in the example 1 now includes 1 wt % of carbon black of which average particle diameter was 0.03 μm. All properties of this M layer film were in favorable range.

Next, the stencil sheet consisting of M layer and supporting member was peeled off from original roll material which was obtained by laminating supporting member consisting of 200 mesh sheet to aforementioned multilayer film as was done in the example 1. Lamination was smooth and M layer of the stencil sheet had even flat face. Curling degree was 3 after 50° C. aging.

When perforating test was conducted wherein semi-conductor laser (maximum power 30 mw, wavelength 780 nm) beam which was focused to be 10 μm spot through collimator lens was applied to this stencil sheet for 1/100 sec., perforating was possible with 5 mw energy and highly precise printing with clean and high resolution was achieved.

For comparison polyethylene terephthalate film (thickness 2 μm) of which crystallinity is 45% by density method and which includes 1 wt % carbon black with average particle diameter 0.03 μm was laminated as supporting member to make stencil sheet and perforating test was conducted where perforating was not possible at same amount of energy.

EXAMPLE 3

Multilayer film consisting of $M_1/P_{B2}.1/M_1$ with respective thickness of 2/15/2 (μm) was manufactured using same films used in example 1 for layer M and $P_{B2}$-1 under the same conditions except that stretching temperature was set at 77° C., atmosphere temperature at 75° C., stretching rate at vertically 4.0, horizontally 3.7 in addition to the one manufactured at same stretching temperature as example 1. This example saw smooth stretching and no puncture or peeling phenomenon between layers occurred. All properties of M layer were in most favorable range for this invention.

Next, multilayer product was obtained by using 200 mesh sheet as supporting member and UV hardening agent as adhesive agent, and by laminating simultaneously the said supporting member to both sides of the said multilayer film. Amount of hardening agent used was 0.4 g/m². Lamination was smooth and homogeneous original roll was obtained. Compression volume of each multilayer film was measured to be −0.8% (reducing) for the former and 1.5% for the latter, and then perforating sensitivity of the stencil sheet for printing which was peeled off from multilayer product as was done in the example 1 was measured and proved to be ultra sensitive. Curling degree was measured to be 14 and 2 (respectively) for 40° C. aging and 27 and 4 (respectively) for 50° C. aging.

For comparison the said supporting member was laminated with 2 μm thick crystal (crystallinity 45% under density method) polyethylene phthalate film which was commercially available. However the product was subjected to wrinkle and lamination was possible only by applying stronger tension to vertical direction and horizontal direction and the resulted film had inferior quality of wrinkles, uneven coating of adhesive agent, breaking and distortion. Furthermore concave and convex of the supporting member was copied to the surface of film and though the surface appeared to be more or less flat initially, curling degree was 8 after 24 hour aging at room temperature (23° C.), 12 for 40° C. aging, and 15 for 50° C. aging.

EXAMPLE 4

Original roll was obtained by manufacturing a sheet shape pattern wherein there were convex with 40 μm height and diameter 20 μm at 150 mesh intervals under resist method and thickness of the base part was 50 μm, using this pattern as a mount, laying and hardening multilayer film consisting of $M_1/P_{B1}.3/M_1$ (thickness 8/8/8 (μm)) obtained by the same method as in aforementioned example 3 after coating UV hardening agent to convex portion. Then stencil sheet consisting of layer $M_1$ and the mount was peeling off from above original roll and it was discovered that the surface of film posessed excellent evenness. Film property of layer $M_1$ was in the most favorable range for the present invention.

For comparison 8 μm thick layer $M_1$ was peeled off from multilayer film with same structure as above and laid on aforementioned mount to manufacture stencil sheet after hardening similarly to the previous description. The product saw uneven surface and wrinkle and coating amount of adhesive agent was not homogeneous.

Nextly, perforating test (peeling mount after perforating) of these stencil sheet was done wherein the stencil sheet of this invention exhibited sufficiently homogeneous perforation with high sensitivity and provided high resolution image at 0.12 mjoule energy level. On the other hand those in comparative examples showed insufficient perforating and less homogeneous image, and in pringing blurring occurred to make resolution inferior. Microscope observation further revealed that image on the stencil sheet in comparative example was lacking in perforating (film sensitivity was not enough) as perforating was too weak where perforating was required, bridge was cut off, and holes were expanded while image on the stencil sheet of the present invention provided dot-shape perforation with bridge consisting of approximately homogeneous polymer.

Clear print with high resolution was achieved from the present invention without defficiency of letters at all when approximately 1000 sheets were printed with automatic printer of drum type automatic inking. In contrast, comparative examples didn't allow sufficient print as resolution was weak but on top of this problem letters were missing in some parts and hallow phenomenon occurred as there was no ink (no perforating) where print was needed.

EXAMPLE 5

Functional layer ($M_1$), peeling layer ($P_{B1}.1$) and peeling layer ($P_{B2}.1$) are separately fused by extruder and though ring shape multilayer die the layer were extruded together to become multilayer tube shape with $M_1/P_{B2}.1/P_{B1}.1/P_{B2}.1/M_1$ structure before it was quenched to be hardened by refrigerant to obtain tube shape original roll. This original roll was then heated to 105° C. and stretched simultaneously to two directions in bubble shape at speed of 50 m/min, and at 103° C. heat so that the roll may be stretched 5.0 times vertically and 5.0 times horizontally before the product was cooled to 20° C. to obtain 1100 mm folding width film folded by deflater.

The film was further applied heatset treatment under 75° C. atmosphere for 5 seconds to be reduced by 3% vertically and 5% horizontally and then pressed by roll heated to 70° C. for 0.5 second before two edges of the film were slit and rolled as two films. Accordingly multilayer film with thickness in order of 1.0/4/3/4/1.0 (μm) was obtained.

The multilayer film obtained by above-mentioned method posessed small peeling strength of 0.8 g/cm width between functional layer part ($M_1$) and peeling layer part ($P_{B2}.1$) to allow easy peeling at 200 m/min speed. Compression rate of functional layer part after peeled as above was 1.2% on average of vertical and horizontal direction.

Functional layer part when similar treatment was applied without heatset was stretched by 0.4%.

Aforementioned functional layer part ($M_1$) possessed tensile break strength 16 kg/mm², tensile elongation at break 100%, elastic modulus in tenstion 220 kg/mm², shrinkage stress value at peek 480 g/mm² at 85° C., 350 g/mm² at 100° C., thermal shrinkage ratio 5% at 70° C., 30% at 80° C., 58% at 90° C. and 70% at 100° C. Peeling layer part possesed a thermal shrinkage ratio 15% at 70° C., 43% at 80° C., 71% at 90° C. and 76% at 100° C.

These values are all average of vertical and horizontal direction.

Nextly, above was laminated with non woven fablic made of polyester type fiber as in example 1, peeling layer part was peeled, and perforating sensitivity of the stencil sheet obtained was measured to be ultra sensitive level as was in the example 1 without losing any sensitivity. Curling degree of the stencil sheet obtained was 0 at 30° C. and 40° C. and about 2 at 50° C.

On the other hand, peeling layer part separated from these stencil sheets was recoverable and allowed recycling by forming functional layer as its front layer once agein.

EXAMPLE 6

Multilayer film was manufactured in same conditions as in example 5 except that thickness of functional layer was made 0.5 μm, 2 μm or 6 μm. This example also permitted homogeneous laying of supporting member. Compression volume of functional layer peeled off from these multilayer films and curling degree of the stencil sheet made of these multilayer films are shown in table 1.

For comparison homogeneous stretching was not possible when functional layer 8 μm alone was stretched as bubbles bursted.

TABLE 1

| Sample No. | thickness (μm) | compression rate (%) before heatset | after heatset | curling degree 30° C. | 40° C. | 50° C. |
|---|---|---|---|---|---|---|
| 1 | 0.5 | 1.0 | 2.5 | 0 | 0 | 0 |
| 2 | 2.0 | 0.3 | 1.0 | 0 | 0 | 3 |
| 3 | 6.0 | 0.1 | 0.4 | 0 | 0 | 5 |

COMPARATIVE EXAMPLE 1

Perforating sensitivity and curling degree was measured for the multilayer film manufactured in example 6 with 2 μm thick functional layer wherein functional layer was peeled off to release compression (sample A), the same film which was attached to fixed frame after peeling and was heatset for 2 min. in air over at 90° C. (sample B), that heatset for 2 min. at 80° C. under the reducing condition by vertically 3% and horizontally 5% (sample C), and that heatset for 2 min. at 90° C. under same condition (sample D). The result is shown in table 2.

TABLE 2

| Sample | perforating sensitivity (mjoule) | curling degree 30° C. | 40° C. | 50° C. |
|---|---|---|---|---|
| A | 0.06 | 0 | 7 | 25* |
| B | 0.075 | 0 | 2 | 13 |
| C | 0.090 | 0 | 0 | 8 |
| D | 0.11 | 0 | 0 | 3 |

*occurrence of delamination

As apparent in this table the film peeled before laid to supporting member has tendency of lowering perforating sensitivity singnificantly when curling resistant property is improved. This is due to reduced characteristic orientation and curling resistant property is hard to improve unless above property is lowered.

EXAMPLE 7

Co-stretching by bubble method in stretching condition same as example 1 followed by press roll treatment at 70° C. for 0.5 sec. was applied to multilayer film (sample No. 1) consisting of $M_1/P_{B1}$-2/$M_1$ which was manufactured using functional layer ($M_1$) and peeling layer ($P_{B1}$-2), multilayer film (sample No. 2) consisting of $M_1/P_{B1}$-2/$P_A$-2/$P_{B1}$-2/$M_1$ which was manufactured using functional layer ($M_1$), peeling layer ($P_{B1}$-2) and assisted peeling layer ($P_A$-2), multilayer film consisting of $M_2/P_{B2}$-2/$P_A$-1/$P_{B2}$-2/$M_2$ (sample No. 3) which was manufactured using functional layer ($M_1$), ethylene-vinylacetate copolymer (acetic acid vinyl unit content 10 wt %, melt index 1.0, Vicat softening point 81° C., fusion point 95° C.) containing 3 wt % mixture of 2 to 1 oleic acid monoglyceride and diglycerol monooleate as release agent and assisted peeling layer ($P_A$-1), and multilayer film consisting of $M_1/P_{B1}$-3/$M_1/P_{B1}$-3/$M_1$ (sample No. 4) which was manufactured using functional layer ($M_1$) and peeling layer ($P_{B1}$-3).

However, stretching in the material No. 3 was made with conditions where stretching temperature was set at 90° C. and atmosphere at 87° C.

At measurement of each functional layer $M_1$ showed about same value as in example 1 regardless of its layer structure, $M_2$ showed tensile break strength 14 kg/mm$^2$, tensile elongation at break 70%, modulus of tensile elasticity 250 kg/mm$^2$, peak of shrinkage stress value 600 g/mm$^2$ at 110° C. and 260 g/mm$^2$ at 100° C., and thermal shrinkage ratio 10% at 80° C., 35% at 100° C. and 55% at 140° C.

Stencil sheet was manufactured using above in the same way as example 1. Table 3 shows compression volume of functional layer of these samples and curling degree and perforating sensitivity when original paper was manufactured.

Next experiment was made on the material No. 3 wherein stretching was made under the same conditions as example 1. Compression volume in this case was −0.2% (stretching), curling degree was 7, 15, and 30 for respective measuring conditions of 30° C., 40° C. and 50° C. Peeling layer was easy to stretch and break off when peeling layer was released after lamination.

TABLE 3

| Sample No. | layer structure (layer thickness) μm | compression volume of functional layer | curling degree 30° C. | 40° C. | 50° C. | Perforating sensitivity (mjoule) |
|---|---|---|---|---|---|---|
| 1 | $M_1/P_{B1}$-2/$M_1$ (1.0/10/1.0) | 0.6 | 0 | 0 | 0 | 0.04 |
| 2 | $M_1/P_{B1}$-2/$P_A$-2/$P_{B1}$-2/$M_1$ (1.5/4/2/4/1.5) | 0.8 | 0 | 0 | 0 | 0.05 |
| 3 | $M_2/P_{B2}$-2/$P_A$-1/$P_{B2}$-2/$M_2$ | 0.2 | 0 | 2 | 5 | 0.075 |

TABLE 3-continued

| Sample No. | layer structure (layer thickness μm) | compression volume of functional layer | curling degree 30° C. | 40° C. | 50° C. | Perforating sensitivity (mjoule) |
|---|---|---|---|---|---|---|
| 4 | (2.0/4/2/4/2.0) $M_1/P_{B1}$-3/$M_1$/$P_{B1}$-3/$M_1$ (1.0/6/1.0/6/1.0) | 0.5 | 0 | 0 | 2 | 0.06 |

COMPARATIVE EXAMPLE 2

Multilayer film (sample G) consisting of layer structure $M_1$/PP/$M_1$ and using only functional layer ($M_1$) and crystalline polypropylene (shortened as PP) used as content of $P_A$.1 as peeling agent, and multilayer film (sample H) consisting of layer structure $M_3$/PP/$M_3$ and using functional layer ($M_3$) and above PP as peeling layer were manufactured in the same way as in example 1. These had tendency to cause peeling between layers during stretching operation.

Though stretching of these samples was conducted by bubble method at stretching temperature 110° C. with stretching magnitude by vertically 3.2 and horizontally 3.2, unstable stretching condition caused bubble shaking and nonuniform section.

This tendency was more apparent in sample H. These samples saw rupture at stretching temperature not more than 105° C. and rupture and irregularity such as a tender at temperature 115° C. or above. In either cases smooth stretching was conducted.

Peeling force of functional layer of the sample which consisted of layers with thickness of 1.0/5/1.0 (μm) and was obtained at stretching temperature 110° C. was 4 to 5 g/cm width which didn't allow smooth peeling as cleavage and cutting occurred. Attempt was made to blend release agent by injection into this peeling layer through on-line but separate condition was created where no homogeneous mixture was possible.

Table 4 shows test results on shrinkage rate (reverse of compression rate) as well as curling degree at time of peeling of functional layer in the sample G and H.

TABLE 4

| Sample | shrinkage rate of functional layer (%) | curling degree 30° C. | 40° C. | 50° C. | perforating sensitivity (mjoule) |
|---|---|---|---|---|---|
| G | 0.1 | 3 | 6 | 15 | 0.09 |
| H | 0.2 | 5 | 10 | 20 | 0.11 |

For further information crystal fusion energy of sample H was 8 cal/g and based on this crystallinity (calculated using crystal fusion energy 30 cal/g of crystal polyethylene terephthalate) was calculated to be about 26%. This film also exhibited heat shrinkage rate 7% at 100° C., 20% at 140° C. and 40% at 160° C.

COMPARATIVE EXAMPLE 3

Quenched original roll was heated to 80° C. before functional layer ($M_3$) of sample H in comparative example 2, stretched by vertically 3.0 magnitude and by horizontally 3.0 in tenter of the following step at 90° C., and multilayer film consisting of $M_3$/PP/$M_3$-1.0/5/1.0 (μm) was manufactured after the sample was heatset at 150° C. fer 5 sec.

This multilayer film has cleavage in the tenter, the dislocation between film layers and the ununiformity of thickness. And the separation of the functional layer and the peeling layer couldn't be made smoothly and the breakage was observed.

The change of size of the functional layer after peeling saw large anisotropy with 0.2% of vertical shrinking amount and 0.05% of horizontal shrinking amount. Curling degree was 5 vertically and 3 horizontally at 30° C., 14 vertically and 8 horizontally at 40° C., and 25 ventically and 20 horizontally at 50° C. The perforating sensitivity of stencil sheet using this film was 0.10 mjoule.

EXAMPLE 8

The functional layer ($M_4$), the peeling layer ($P_{B1}$.3) and the assisted peeling layer ($P_A$.1) were separately fused by extruder and through ring shape multilayer die the layer was extruded together to become multilayer tube shape with $M_4$/$P_{B1}$.3/$P_A$.1/$P_{B1}$.3/$M_4$ structure before it was quenched to be hardened by refrigerant to obtain tube shape original roll. Then the original roll was cooled by air of 20° C. after the simultaneous biaxial stretching in bubble shape at 100° C. so that the roll may be stretched 3.0 times vertically and 3.0 times horizontally. Two edges of the film were slit and rolled up by rewinder as two films. The thickness of each layer in this laminating film was 1/8/2/8/1 (μm). The peeling force between the functional layer part ($M_4$) and the peeling layer part ($P_{B1}$.3) is as small as 1.0 g/cm width in the multilayer film obtained in above-mentioned way, and the multilayer film was readily releasable.

The compressibility of the functional layer after peeling was 2.7% on an average of length/width. The thermal shrinkage rate at 100° C. of the layer ($M_4$) was 43% and the thermal shrinkage stress value of the layer ($M_4$) was 460 g/mm$^2$. Both values are the average value of length/width.

The perforating sensitivity of the stencil sheet obtained by peeling of the peeling layer was high sensitivity level of 0.08 mjoule after laminating the non woven fabric of polyester fiber in the same way as example 1. The curling degree of the stencil sheet obtained in this way was 0 at 30° C., 2 at 40° C. and 5 at 50° C. When $M_4$ layer was peeled to be a single layer for comparison the curling degree was respectively 8, 30, 40 and delamination phenomenon was occurred.

EXAMPLE 9

The functional layer ($M_5$), the peeling layer ($P_{B1}$.3) and the peeling layer ($P_A$.1) were extruded through ring shape multilayer die to become tube shape with $M_5$/$P_{B1}$.3/$P_A$.1/$P_{B1}$.3/$M_5$ structure before it was quenched to be hardened by refrigerant to obtain tube shape original roll. Then the original roll was cooled by air at 20° C. after the simultaneous biaxial stretching in bubble shape at 90° C. so that the roll may be stretched 3.0 times vertically and 3.0 times horizontally. Two edges of the film were slit and rolled up by rewinder as two films. The thickness of each layer in this laminating film was 1/6/2/6/1 (μm).

The peeling force between the functional layer (M$_5$) and the peeling layer was as small as 1.0 g/cm width in the multilayer film obtained in aforesaid way, and the multilayer film was readily releasable. The shrinkage rate of the functional layer after peeling was 0.3% on an average of length/width. The shrinkage rate of the functional layer (M$_5$) at 100° C. was 63% and the shrinkage stress at 70° C. was 210 g/mm$^2$. Both values are the average value of length/width. The perforating sensitivity of the stencil sheet obtained by peeling of the peeling layer was high sensitivity level of 0.07 mjoule after laminating the non woven fabric of polyester fiber in the same way as example 1. The curling degree of the stencil sheet obtained in this way was 0 at 30° C., 5 at 40° C. and 8 at 50° C.

COMPARATIVE EXAMPLE 4

After obtaining the tube shape original roll like example 1, the original roll was cooled by air at 20° C. after the simultaneous biaxial stretching in bubble shape at 130° C. so that the roll may be stretched 1.5 times vertically and 1.5 times horizontally. The thickness of each layer in the obtained laminating film (M$_1$/P$_{B2}$-1/P$_A$-1/P$_{B2}$-1/M$_1$) was 3/3/6/3/3/ μm. The peeling force between the functional layer (M$_1$) and the peeling layer in the obtained multilayer film was 5.5 g/cm width and this multilayer film was a little bit hard to peel and was easy to be torn. The shrinkage rate of the functional layer (M$_1$) at 100° C. was 23% and its balanced value was 28% with the temperature of 110° C. The shrinkage stress (equals to peak value) at 100° C. was 45 g/mm$^2$. These values are the average of length/width.

Enough perforation couldn't be acquired even though perforation sensitivity was measured to be 0.13 mjoule for the stencil sheet obtained by peeling the peeling layer after laminating the non woven fabric of polyester fiber in the same way as example 1.

COMPARATIVE EXAMPLE 5

Comparative example 5 was proceeded in the same way as example 1 except for the final thickness of the functional layer of 15 μm. Enough perforation couldn't be acquired even though the perforating sensitivity of the obtained stencil sheet was measured to be 0.13 mjoule.

What is claimed is:

1. A costretched high-sensitivity thermosensitive multilayer film comprising at least one functional layer (M) and at least one peeling layer (P),
    said functional layer (M) having a thickness in the range of 0.1 to 12 μm comprising a thermoplastic resin having a thermal shrinkage ratio of at least 30% and a thermal shrinkage stress value of at least 50 g/mm$^2$, and
    said peeling layer (P) having a Vicat softening point in the range of 30° to 120° C. comprising a thermoplastic resin that is different from the thermoplastic resin comprised in said functional layer (M) and at least one release agent, wherein
    said peeling layer (P) is contiguous to said functional layer (M), wherein
    said peeling layer (P) and said functional layer (M) are both easily peelable, and wherein
    said peeling layer (P) exerts compression force producing a compression strain in the range of 0.05 to 10% upon said functional layer (M) in at least one direction.

2. A method for the production of a high-sensitivity thermoplastic stencil sheet from a costretched high-sensitivity thermosensitive multilayer film comprising more than one functional layer (M) and at least one peeling layer (P),
    said more than one functional layer (M) each having a thickness in the range of 0.1 to 12 μm comprising a thermoplastic resin having a thermal shrinkage ratio of at least 30% and a thermal shrinkage stress value of at least 50 g/mm$^2$, and
    said peeling layer (P) having a Vicat softening point in the range of 30° to 120° C. comprising a thermoplastic resin that is different from the thermoplastic resin comprised in said functional layer (M) and at least one release agent, wherein
    said peeling layer (P) is contiguous to said functional layer (M), wherein
    said peeling layer (P) and said functional layer (M) are both easily peelable, wherein
    said peeling layer (P) exerts compression force producing a compression strain in the range of 0.05 to 10% upon said functional layer (M) in at least one direction, and wherein
    at least one of the functional layers (M) is superposed on each of the opposite surfaces of said peeling layer (P),
    said method comprising superposing a porous supporting member (S) layer on at least one of said functional layers (M) and separating said multilayer film along the interface between said functional layer (M) and said peeling layer (P), thereby relieving said functional layer (M) from said compressive force exerted by said peeling layer (P) and enhancing the resistance of the stencil sheet to curling.

3. A laminate comprising a costretched high-sensitivity thermosensitive multilayer film comprising at least one functional layer (M) and at least one peeling layer (P),
    said functional layer (M) having a thickness in the range of 0.1 to 12 μm comprising a thermoplastic resin having a thermal shrinkage ratio of at least 30% and a thermal shrinkage stress value of at least 50 g/mm$^2$, and
    said peeling layer (P) having a Vicat softening point in the range of 30° to 120° C. comprising a thermoplastic resin that is different from the thermoplastic resin comprised in said functional layer (M) and at least one release agent, wherein
    said peeling layer (P) is contiguous to said functional layer (M), wherein
    said peeling layer (P) and said functional layer (M) are both easily peelable, wherein
    said peeling layer (P) exerts compression force producing a compression strain in the range of 0.05 to 10% upon said functional layer (M) in at least one direction, and wherein
    a porous supporting member (S) layer is superposed on at least one functional layer (M) of said film.

4. The costretched high-sensitivity thermosensitive multilayer film according to claim 1, wherein said thermoplastic resin in a state forming the film of said functional layer (M) has crystallinity in the range of 0 to 30%.

5. The costretched high-sensitivity thermosensitive multilayer film according to claim 1, wherein said thermoplastic resin comprised in said functional layer (M), has a thermal shrinkage ratio of at least 30% at a temperature in the range of 60° to 170° C. and a thermal shrinkage stress value of at least 50 g/mm² at a temperature in the range of 60° to 150° C.

6. The costretched high-sensitivity thermosensitive multilayer film according to claim 1, wherein the crystallinity of said thermoplastic resin of said peeling layer (P) determined by the DSC method is not more than 60%.

7. The costretched high-sensitivity thermosensitive multilayer film according to claim 1, wherein said peeling layer (P) consists of a multilayer peeling layer composed of at least one assisted peeling layer ($P_A$) and at least one release agent-containing main peeling layer ($P_B$), wherein said assisted peeling layer ($P_A$) is comprised of a thermoplastic resin having a crystal melting point higher than the stretching temperature of said functional layer (M) and a Vicat softening point of higher than 120° C.

8. The costretched high-sensitivity thermosensitive multilayer film according to claim 1, wherein said peeling layer (P) consists of a multilayer peeling layer composed of at least one assisted peeling layer ($P_A$) and at least one release agent-containing main peeling layer ($P_B$) adjoining either surface of said assisted peeling layer ($P_A$) and is easily peelable from said function layer (M), wherein said peeling layers are so superposed that the separation between $P_B$ and $P_A$ will either not occur or will occur only under a peeling force greater than that for the separation between M and $P_B$.

9. The costretched high-sensitivity thermosensitive multilayer film according to claim 1, which comprises more than one functional layers (M), wherein at least one of the functional layers (M) is superposed on each of the opposite surfaces of said peeling layer (P).

10. The costretched high-sensitivity thermosensitive multilayer film according to claim 1, wherein said thermoplastic resin of said functional layer (M) is substantially amorphous and has a Vicat softening point in the range of 40° to 150° C., and comprised mainly of at least one member selected from the group consisting of a polyester resin, a polyamide resin, a polycarbonate resin and an ethylene-vinyl alcohol copolymer resin.

11. The method according to claim 2, wherein at least one of the functional layers (M) is superposed on each of the opposite surfaces of said peeling layer (P).

12. The method according to claim 2, wherein said peeling layer (P) consists of a multilayer peeling layer composed of an assisted peeling layer ($_A$) and a release agent-containing main peeling layer ($P_B$) superposed on either surface of said assisted peeling layer ($P_A$), wherein said assisted peeling layer ($P_A$) is comprised of a thermoplastic resin having a crystallizing temperature higher than the stretching temperature of the functional layer (M) and a Vicat softening point of higher than 120° C.

13. The method according to claim 2, wherein said functional layer (M) is substantially amorphous and has a Vicat softening point in the range of 40° to 150° C., and comprised mainly of at least one member selected from the group consisting of a polyester resin, a polyamide resin, a polycarbonate resin and an ethylene-vinyl alcohol copolymer resin.

14. The laminate according to claim 3, wherein at least one functional layer (M) is disposed on each of the opposite surfaces of said peeling layer (P), and having provided on each of the outer surfaces thereof, a porous supporting member (S) layer.

15. The laminate according to claim 3, wherein said peeling layer (P) comprises an assisted peeling layer ($P_A$) and a release agent-containing main peeling layer ($P_B$) disposed on either surface of said assisted peeling layer ($P_A$).

* * * * *